Patented Sept. 2, 1947

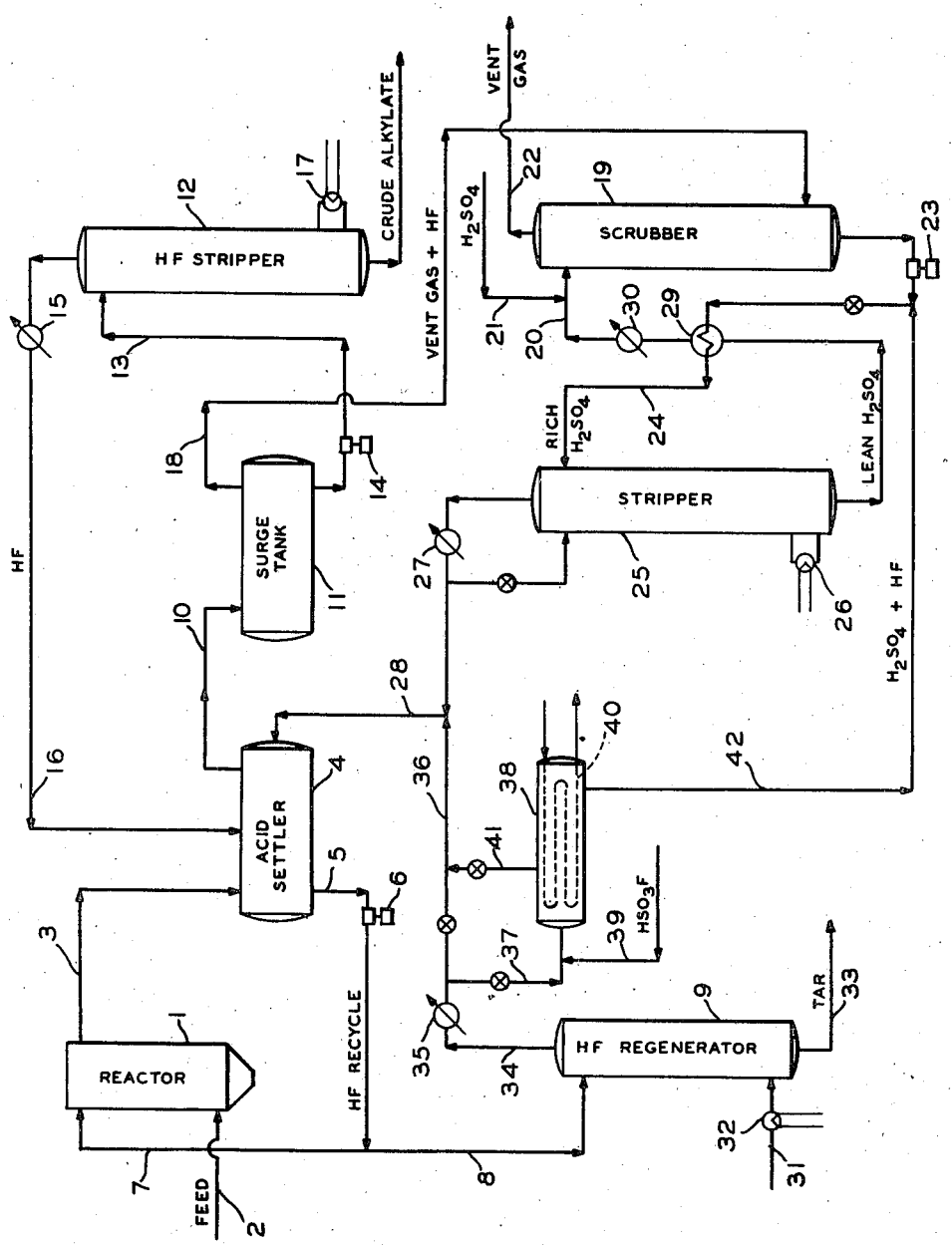

2,426,841

UNITED STATES PATENT OFFICE 2,426,841

RECOVERY OF HYDROGEN FLUORIDE

Claude C. Peavy, Summit, N. J., and John Happel, Brooklyn, N. Y., assignors to Socony-Vacuum Oil Company, Incorporated, a corporation of New York Application January 23, 1946, Serial No. 642,832

1 Claim. (Cl. 260—683.4)

This invention relates to a method and means for recovering hydrogen fluoride from hydrocarbon mixtures containing the same and is particularly well adapted to the recovery and purification of hydrogen fluoride in processes of hydrocarbon reactions where hydrogen fluoride is employed as a catalyst.

Hydrogen fluoride has been found to be a highly useful catalytic agent for a number of hydrocarbon reactions since it is a powerful condensing agent but has little or no tendency to unite chemically with hydrocarbons, particularly those of a saturated nature. Among the condensation reactions to which hydrogen fluoride is suited, paraffin alkylation by the catalytic condensation of olefins and isoparaffins is outstanding commercially. The invention will therefore be discussed with particular reference to paraffin alkylation as a typical example without intention to limit the invention thereto or thereby.

In present commercial hydrogen fluoride alkylation, as in many other processes catalyzed by this agent, the system will contain organic compounds having boiling points of the same order as that of the catalyst. To a large extent, these organic compounds are reactants in the process and may be recycled with the catalyst to the reaction zone. Certain of the hydrocarbons are non-reactive in the process and tend to build up in the system unless some means is provided for their removal.

Certain elements in the system are normally vented to release undesirable compounds and upon shutdown of the system as a whole or shutdown of any element, such as a pump for repair while transferring operations to stand-by equipment, the shutdown elements must be purged of hydrogen fluoride in order that they can be examined or repaired.

As a result of these several factors, a hydrogen fluoride alkylation plant normally has a fairly large amount of gaseous mixtures containing hydrocarbons and hydrogen fluoride requiring some means for disposal. Obviously, discharge to the air of gases containing such a highly poisonous agent as hydrogen fluoride is impossible. The gases can be washed with caustic but the wash water cannot be discharged to normal sewage disposal means because the inorganic fluorides are poisonous. The usual disposal is to discharge liquids containinng fluorides into a lime pit which can thereafter be covered over.

According to the present invention, hydrogen fluoride is selectively removed from the gases to be vented in a state of reasonably high purity and can be directly returned to the system or condensed and held in cylinders or tanks for later use.

It is a principal object of this invention to selectively remove hydrogen fluoride from vent gases and other mixtures with hydrocarbons and recover the hydrogen fluoride for re-use in the system. This object is attained by scrubbing the gaseous mixture with sulfuric acid to absorb the hydrogen fluoride in the scrubbing medium. The enriched sulfuric acid is then stripped and the relatively pure hydrogen fluoride recovered therefrom. The invention has a further advantage in that it is peculiarly suited to combination with a step of reacting hydrogen fluoride containing water with fluosulfonic acid. Such reaction produces hydrogen fluoride and sulfuric acid and the mixture of acids may be charged directly into the stripper of the hydrogen fluoride recovery system wherein the mixture is separated into hydrogen fluoride for return to the alkylation reaction and sulfuric acid which serves as make-up for the recovery plant.

Further objects and advantages of the invention will be more clearly understood from consideration of a typical operation employing the invention as shown in the single figure of drawings annexed hereto representing diagrammatically the principal features of an alkylation plant embodying the present hydrogen fluoride recovery method.

The alkylation reaction per se is primarily conducted in a reactor 1 wherein a feed mixture from line 2 containing isoparaffins and olefins (e. g. isobutane and butylenes) is intimately contacted with liquid hydrogen fluoride. The feed contains an excess of isoparaffin and the reaction mixture is recirculated in the reactor in order to further increase the molar excess of saturated reactant, all in accordance with the usual practice in the art. A portion of the reaction mixture is continuously withdrawn through line 3 to a settler 4 wherein the mutually immiscible liquid phases separate to give an upper hydrocarbon layer and a lower hydrogen fluoride layer. The lower layer is recirculated by line 5 and pump 6 in part to reactor 1 by recycle line 7 and in part diverted by line 8 to a regenerator 9 which is considered in more detail hereinafter.

The upper hydrocarbon layer in the acid settler 4 is transferred by line 10 to a surge tank 11 which feeds a hydrogen fluoride stripper 12 by way of line 13 and pump 14. In stripper 12 dissolved hydrogen fluoride is removed from the hydrocarbon mixture and the overhead is condensed in condenser 15 and returned by line 16 to the acid settler from which it finds its way to the reactor 1 by the recycle from settler 4 in the manner discussed above. Heat is supplied to stripper 12 by a reboiler 17 and the overhead from the stripper will of course contain considerable light hydrocarbons, most of which are suitable for recycling in the system.

The surge tank 11 is operated under such conditions that a gaseous phase separates therein to be vented by line 18. This is a convenient means of removing from the system such undesirable materials as propane and lighter hydrocarbons which do not react and which would otherwise tend to build up in the system and reduce the efficiency of the operation. According to the invention these vent gases are transferred to the bottom of a scrubber 19 and sulfuric acid is admitted to the top of scrubber 19 from line 20, make-up acid being supplied from line 21 as needed. Vent gases stripped of hydrogen fluoride pass overhead from the scrubber and are removed by line 22 for use as fuel or discharged to the atmosphere as circumstances may require.

The enriched sulfuric acid is transferred by pump 23 and line 24 to a stripper 25 equipped with reboiler 26. In the stripper, hydrogen fluoride is removed from sulfuric acid in a substantially pure state, condensed in condenser 27 and returned to the acid settler by line 28. The stripped sulfuric acid is removed from the bottom of the stripper, passed through heat exchanger 29 against the enriched sulfuric acid from the scrubber and is then cooled in heat exchanger 30. Cooled acid from exchanger 30 is supplied to the top of the scrubber 19 by line 20 as previously stated.

The conditions of temperature and pressure prevailing in scrubber 19 and stripper 25 will be governed primarily by the pressures found convenient for co-ordination of the recovery system with the alkylation plant in general. It will be apparent that the scrubber is operated at considerably lower temperature than the stripper and in most instances the recovery system will operate at pressures only slightly in excess of atmospheric, say 5 to 15 lbs. At such pressures the scrubber can be conveniently operated at temperatures easily achieved by plant cooling water, say about 70 to about 90° F. and the stripper may be operated at about 150° F. The sulfuric acid absorbing medium will tend to accumulate water during the operation and a drag stream from the recovery system may be diverted continuously or intermittently to suitable acid concentrators.

As is above noted, the present recovery system is admirably adapted to combination with a step of maintaining the concentration of the hydrogen fluoride catalyst at suitably high level by a step of reacting recycle hydrogen fluoride at some point in the system with fluosulfonic acid. In the embodiment shown this is accomplished by treating a portion or all of the hydrogen fluoride recycled from the regenerator 9. The regenerator 9 is of conventional design, being essentially a flash evaporation with stripping of the liquid residue by a suitable stripping medium such as isobutane supplied by line 31 through heater 32. A heavy residue, commonly known as tar, is removed from the bottom of the regenerator by a line 33 and discarded from the system. The overhead from regenerator 9 consists substantially of hydrogen fluoride contaminated by some water and hydrocarbons. The latter includes hydrocarbons dissolved in the hydrogen fluoride as removed from the acid settler and hydrocarbons supplied to regenerator 9 as a stripping medium. This mixture is taken overhead by line 34 to condenser 35 from which the liquid mixture is transferred in whole or part by line 36 to line 28 from which the regenerated acid is returned to the acid settler. For removal of water, a portion of the condensate from condenser 35 may be diverted by line 37 to a reactor-settler 38 in admixture with fluosulfonic acid from line 39. Preferably, the liquids in reactor-settler 38 are slightly heated as by a steam coil 40 to promote the reaction between fluosulfonic acid and water, yielding sulfuric acid and hydrogen fluoride. The resultant mass separates into two liquid phases of which the upper layer is hydrocarbons containing dissolved hydrogen fluoride free of water which is returned to line 36 by pipe 41. The lower layer consists primarily of sulfuric acid and hydrogen fluoride and is transferred by line 42 to the stripper feed of the hydrogen fluoride recovery system.

We claim:

In a process of paraffin alkylation wherein isoparaffins and olefins are intimately contacted with hydrogen fluoride in a reaction zone to induce condensation, the reaction mixture is settled to yield an acid phase and a hydrocarbon phase, light gaseous hydrocarbons containing gaseous hydrogen fluoride vented from said hydrocarbon phase and the said acid phase is returned at least in part to said reaction zone; the improvement which comprises scrubbing light gaseous mixtures of low boiling hydrocarbons and hydrogen fluoride vented as aforesaid from the reaction mixture with sulfuric acid to selectively absorb hydrogen fluoride in a scrubbing zone, stripping the enriched sulfuric acid in a stripping zone to recover hydrogen fluoride therefrom, returning hydrogen fluoride so recovered to said reaction zone, reacting a portion of the hydrogen fluoride from said acid phase containing water with fluosulfonic acid, withdrawing from said reaction with fluosulfonic acid a mixture of hydrogen fluoride and sulfuric acid and introducing said mixture of hydrogen fluoride and sulfuric acid to said stripping zone.

CLAUDE C. PEAVY.
JOHN HAPPEL.

REFERENCES CITED

The following references are of record in the file of this patent:

UNITED STATES PATENTS

| Number | Name | Date |
|---|---|---|
| 2,378,636 | Iverson | June 19, 1945 |
| 2,388,135 | Frey | Oct. 30, 1945 |
| 1,960,347 | Osswald et al. | May 29, 1934 |

FOREIGN PATENTS

| Number | Country | Date |
|---|---|---|
| 289,383 | Great Britain | July 4, 1929 |